United States Patent [19]

Liehr et al.

[11] Patent Number: 4,552,301

[45] Date of Patent: Nov. 12, 1985

[54] METHOD OF BONDING CERAMIC COMPONENTS TOGETHER OR TO METALLIC COMPONENTS

[75] Inventors: Manfred R. Liehr; Wolfgang Nolting, both of Hamburg; Rolf U. D. Kobs, Tornesch; Reiner U. Orlowski, Quickborn, all of Fed. Rep. of Germany

[73] Assignee: U.S. Philips Corporation, New York, N.Y.

[21] Appl. No.: 585,706

[22] Filed: May 17, 1984

[51] Int. Cl.$^4$ .................. B23K 35/28; B23K 20/16
[52] U.S. Cl. .................. 228/263.12; 228/194; 228/234
[58] Field of Search .................. 228/263.12, 263.11, 228/263.17, 122, 123, 194, 234

[56] References Cited

U.S. PATENT DOCUMENTS

| 2,781,577 | 2/1957 | Smellie | 228/263.17 |
| 3,233,309 | 2/1966 | Emeis | 228/123 |
| 3,795,041 | 3/1974 | Hennicke et al. | 228/194 |
| 4,247,034 | 1/1981 | Burkart et al. | 228/263.12 |

Primary Examiner—Nicholas P. Godici
Assistant Examiner—Samuel M. Heinrich
Attorney, Agent, or Firm—Norman N. Spain

[57] ABSTRACT

The invention relates to a method for the force-coupled and vacuum-tight bonding of components of ceramic material together or to metallic components by means of thermocompression while using a soldering material in the form of an AlMgZn alloy provided between the components to be bonded prior to the thermocompression process. The soldering material used consists preferably of an aluminum-zinc-magnesium alloy having 95% by weight of Al, 4% by weight of Zn and 1% by weight of Mg.

4 Claims, No Drawings

METHOD OF BONDING CERAMIC COMPONENTS TOGETHER OR TO METALLIC COMPONENTS

The invention relates to a method for the force-coupled and vacuum-tight bonding of ceramic components, for example of aluminum oxide, together or to metallic components by means of thermocompression (T.C.) by using a soldering material provided between the components to be bonded prior to the thermocompression process.

It is known to bond together ceramic components of $Al_2O_3$ by hard soldering and by thermocompression. It is also known to bond alloyed steels, for example high-speed steel 1.4057, to components of aluminum oxide by hard soldering and thermocompression. Thermocompression is a bonding method which, as compared with known soldering methods, proceeds extremely rapidly and hence is time-saving.

In a known method of bonding ceramic components of aluminium oxide, pure aluminum is used, for example, as a soldering material in the thermocompression. The pure aluminum used has a degree of purity of 99.999%. Bonding occurs in such manner that the two components are bonded together with an interposed wire of pure aluminum at a bonding temperature of the material of approximately 450° to 550° C. in a vacuum or nitrogen-hydrogen atmosphere. The compression pressure is, for example, 20 N/mm².

In the same manner, for example, high-speed steel 1.4057 can be bonded by thermocompression to ceramic components of aluminum oxide by using a soldering wire of pure aluminum having a degree of purity of 99.999%.

The pressure depends on the bonding area to be expected. Said bonding area results from the extension of the bonding material after the T.C. process. (Empirical values).

It has been found that the bonds manufactured by means of pure aluminum are not sufficiently rigid. The bond shows permanent deformation upon tensile and pressure load below the sigma 0.2 limit which may lead to failure in vacuum tightnesses. Pure aluminum hence can not be used in constructions which are subject to tensile or compression loads (for example, capacitive sensor systems).

It is the object of the invention to provide a method of bonding ceramic components, for example of $Al_2O_3$, together and to metallic components, for example, of alloyed steels, in which such a rigid and tight bond is formed by thermocompression that the thermocompression bond itself is stronger than that of the ceramic aluminum oxide material.

According to the invention this object is achieved by using a soldering material of an aluminum-zinc-magnesium alloy having the composition 91.1% to 97.9 by weight of Al, 1.6 to 5.3% by weight of Zn and 0.5 to 3.6% by weight of Mg.

This material is cold-hardenable but at the processing temperatures of approximately 500° C. it has the same plastic deformability as, for example, Al 99.999%.

In a preferred embodiment of the method the soldering material consists of an alloy having the composition 95% by weight of Al, 4% by weight of Zn and 1% by weight of Mg.

It has been found that such a bond under tensile load can no longer be detached in the seam, that the ceramic material rather than the bond under load suffers from damage, and that permanent deformation in the seam in the case of compression load of 250 N/mm² and tensile load up to fracture cannot be established. The bond is perfectly vacuum-tight.

The method may be used, for example, in manufacturing capacitive sensors.

What is claimed is:

1. A method for the force-coupled and vacuum-tight bonding of ceramic components together or to metallic components by means of thermocompression by using a soldering material provided between the components to be bonded prior to the thermocompression process, characterized by the use of a soldering material of an aluminum-zinc-magnesium alloy having the composition 91.1 to 97.7% by weight of Al, 1.6 to 5.3% by weight of Zn and 0.5 to 3.6% by weight of Mg.

2. A method as claimed in claim 1, characterized in that an alloy is used of 95% by weight of Al, 4% by weight of Zn and 1% by weight of Mg.

3. A method as claimed in claim 1, characterized in that the components are bonded together by thermocompression at a temperature of approximately 500° C.

4. A method as claimed in claim 2, characterized in that the components are bonded together by thermocompression at a temperature of approximately 500° C.

* * * * *